3,120,568
RECOVERY OF ALLYL CHLORIDE
David Brown, Greenwich, Conn., assignor to Halcon International, Inc., a corporation of Delaware
Filed Dec. 22, 1960, Ser. No. 77,727
5 Claims. (Cl. 260—654)

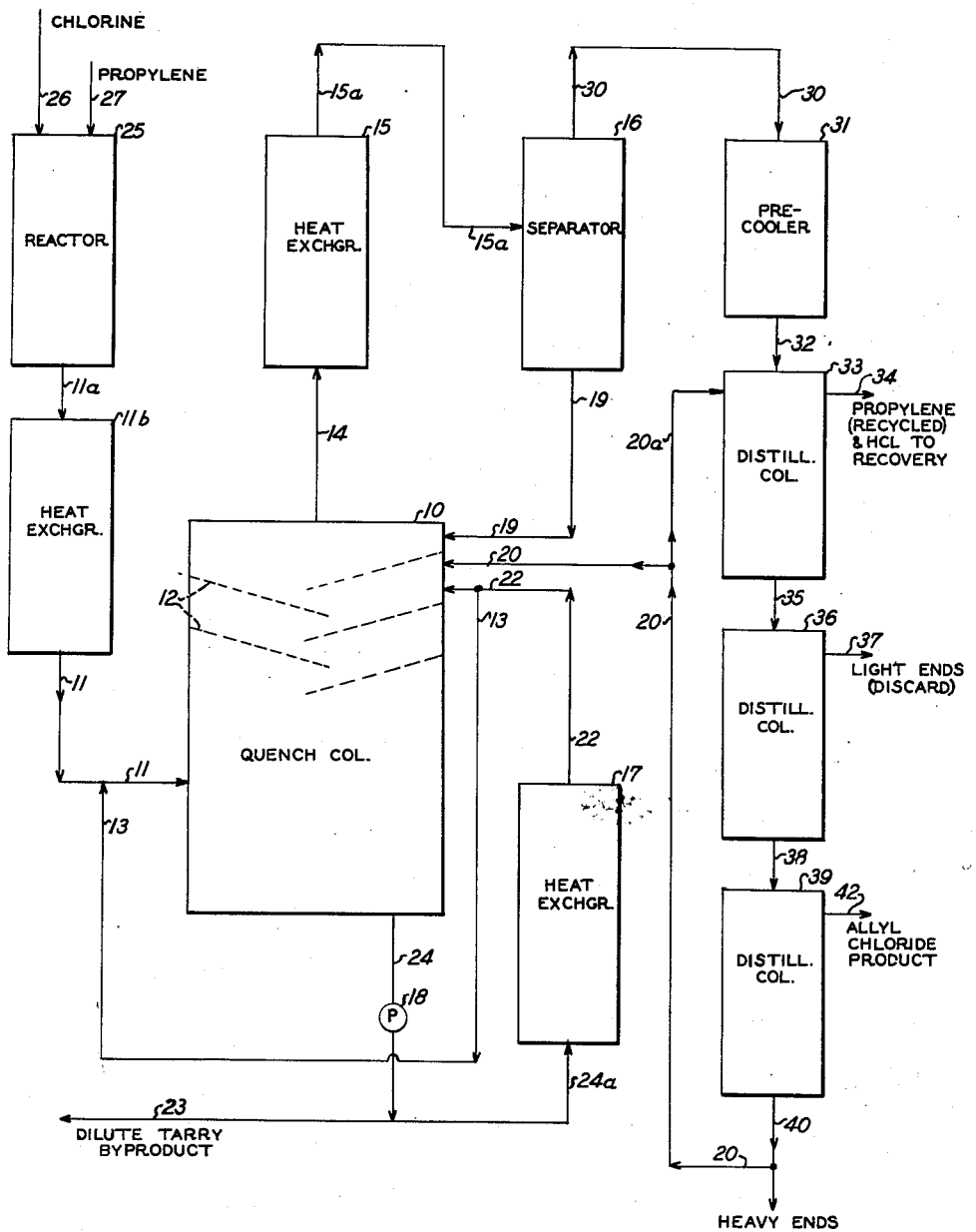

This invention relates to processes for the production of allyl chloride by the high temperature chlorination of propylene, more particularly to such a process carried out in a continuous manner, and especially to such a process wherein the chlorination reactor effluent separated into desired products and by-products and the heavy ends residue from the last distillation is used as reflux in the first fractionation wherein unreacted propylene and by-product hydrogen chloride are taken off as an overhead fraction.

Commercial production of allyl chloride by the high temperature chlorination of propylene involves the non-catalytical chlorination of propylene in the vapor phase at about 500 to 510° C. in adiabatic reactors. (See for instance Chemical Engineering Progress "Trans Ssction," vol. 43 No. 6, June 1947, starting on page 280.)

The reactor effluent is fractionated to take off by-product hydrogen chloride and unreacted propylene, and the residue is then processed in a first distillation column to remove light ends overhead and then in a second distillation column to remove the allyl chloride product as overhead and leave a heavy ends residue. The feed propylene is wet and is subjected to a drying treatment before mixing with the chlorine. The hydrogen chloride by-product is absorbed in water and recovered as concentrated aqueous hydrochloric acid. The propylene leaving the hydrochloric absorber is scrubbed with caustic and then compressed and stored with fresh feed propylene. The foregoing operation is economically disadvantageous in using low temperature propylene as reflux in the first fractionation and requiring high gas volumes and flow rates. The art is confronted by the problem of providing even more efficient processes for the production of allyl chloride without the foregoing disadvantages.

The discoveries associated with the invention relating to the solution of the above problems, and the objects achieved in accordance with the invention as set forth herein include the provision of:

A process for the production of allyl chloride including the steps of reacting propylene with chlorine at elevated temperatures, quenching the reactor effluent and removing condensed tarry materials therefrom, fractionating the resulting effluent to remove unreacted propylene and by-product hydrogen chloride, followed by distilling off light ends and then distilling allyl chloride as overhead product, leaving a heavy ends residue, and including the improvement of using the heavy ends residue as a reflux in the fractionating step;

Such a process wherein the reactor effluent is pre-cooled prior to quenching;

Such a process wherein at least a part of the final heavy ends residue is used as reflux in the quenching;

Such a process wherein the vapor fraction from the fractionating step is principally propylene and hydrogen chloride, the pressure in this step being about 17 p.s.i.a. and the temperature about −25° C.;

Such a process wherein about 10 equivalent gaseous volumes of reflux (as liquid) are used per 125 volumes of vapor fraction removed;

And other objects which will be apparent as details or embodiments of the invention are set forth hereinafter.

The accompanying drawing is a schematic illustration of the invention.

In order to indicate still more fully the nature of the present invention, the following example of a typical procedure is set forth in which parts and percents mean parts and percents by weight, respectively, unless otherwise indicated it being understood that this example is presented as illustrative only and is not intended to limit the scope of the invention.

*Example 1*

Referring to the drawing, allyl chloride reactor effluent is introduced into quench column 10 via line 11. The column is provided with baffles 12, and the vapors from the quench column pass up through line 14, heat exchanger 15, line 15a and separator 16.

The vapors from separator 16 pass via line 30 (at 20° to 200° C.) to heat exchanger or precooler 31 and then via line 32 to fractionator column 33. An overhead material is withdrawn therefrom containing propylene (which is subsequently separated and recycled) and hydrogen chloride which may be scrubbed out with water and recovered as hydrochloric acid.

The liquid condensate in separator 16 is passed via line 19 as reflux to the quench. Additional quench is introduced via line 20 (as described below). The quench is introduced near the top to avoid entrainment. Liquid material is drawn off from the bottom of column 10 via line 24 and pump 18, and a small stream thereof is drawn off through line 23 to dilute tarry by-product storage. The remaining liquid is passed via line 24a to heat exchanger 17 where it is cooled (at high flow velocity) and then passed via line 22 as additional quench liquid to column 10. Alternatively, a part or all of the liquid in line 22 may be passed via line 13 as a direct quench into line 11.

The feed to the reactor 25 is chlorine introduced via line 26 and propylene introduced via line 27. About 2 to 5 mols of propylene may be used per mol of chlorine feed. These are reacted non-catalytically at about 500° to 510° C., and the effluent from the reactor is passed via line 11a to heat exchanger 11b where it may be cooled, if desired, and then passed via line 11 to column 10. The temperature of the reactor effluent entering column 10 may be in the range of 200° to 600° C.

The bottoms from fractionator column 33 is passed via line 35 to distillation column 36 and a light ends material is taken off as overhead therefrom via line 37 and may be discarded. The bottoms from distillation column 36 is passed via line 38 to distillation column 39, and allyl chloride product is taken off as an overhead via line 42. The bottoms fraction from distillation column 39 is drawn off via line 40 and some may be sent to heavy ends storage. A part thereof may be passed via line 20 as quench liquid to column 10. Another part is passed via line 20a as reflux to column 33.

The temperature in column 33 is minus 25° C. (−25° C.) and 10 equivalent gaseous volumes at standard temperature and pressure in actual liquid state per hour of reflux, is introduced via line 20a, the pressure being 17 p.s.i.a. About 125 equivalent gaseous volumes at standard temperature and pressure in actual vapor state per hour of vapor, principally propylene and hydrogen chloride, is removed via line 34.

As compared to prior methods using propylene reflux and very low temperatures, the present process results in lower utilities consumption and lower capital cost. Less compression and smaller towers are needed. In addition, the danger of plugging due to freezeups is eliminated.

Operating in this manner under the usual reactor conditions, the elimination of tarry materials via the bleed stream from the quench column avoids the deposition of solid or tarry materials in all the subsequent steps.

If desired the hydrochloric acid liquors may be distilled to recover anhydrous hydrogen chloride, and some of the latter may be used to remove moisture from propylene, as set forth in detail in the U.S. patent application Serial No. 77,728, filed December 22, 1960, entitled "Chemical Process and Apparatus."

In view of the foregoing disclosures, variations and modifications thereof will be apparent to one skilled in the art, and it is intended to include within the invention all such variations and modifications except as do not come within the scope of the appended claims.

What is claimed is:

1. A process for the preparation of allyl chloride which comprises: passing propylene and chlorine into a reactor; reacting said propylene and chlorine; withdrawing from said reactor a reactor effluent containing unreacted propylene, by-product hydrogen chloride, tarry materials, light ends, heavy ends and allyl chloride; quenching the reactor effluent so as to condense the tarry material; passing the uncondensed material to a fractionation zone; separating overhead by-product hydrogen chloride and unreacted propylene; passing the residue to a first distillation zone; separating the light ends as an overhead product; passing the residue to a second distillation zone; withdrawing allyl chloride as the overhead product; and recycling the heavy ends residue as reflux to said fractionation zone.

2. The process of claim 1 wherein a portion of the heavy ends residue is recycled to the quenching.

3. In a process for the preparation of allyl chloride by the chlorination of propylene wherein by-product hydrogen chloride and unreacted propylene are separated from the reaction mass by fractionation, and wherein the residual reaction mass is successively subjected to two distillation steps wherein the light ends and the allyl chloride product, respectively, are removed as distillates, the improvement of separating the heavy ends residue from said second distillation, recyling the said heavy ends residue to said fractionation step, and introducing said heavy ends residue as reflux in said fractionation step.

4. A process of claim 3 wherein the vapor fraction from the fractionating step is principally propylene and hydrogen chloride, the pressure in this step being about 17 p.s.i.a. and the temperature is $-25°$ C.

5. A process of claim 4 wherein about 10 equivalent gaseous volumes of reflux (as liquid) are used per 125 volumes of vapor fraction removed.

References Cited in the file of this patent

UNITED STATES PATENTS 2,077,382     Engs et al. _____ Apr. 20, 1937